(12) United States Patent
Kasano et al.

(10) Patent No.: US 7,904,452 B2
(45) Date of Patent: Mar. 8, 2011

(54) INFORMATION PROVIDING SERVER, INFORMATION PROVIDING METHOD, AND INFORMATION PROVIDING SYSTEM

(75) Inventors: Koji Kasano, Tokyo (JP); Toshihiro Fujibayashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/419,940

(22) Filed: Apr. 7, 2009

(65) Prior Publication Data

US 2010/0057721 A1 Mar. 4, 2010

(30) Foreign Application Priority Data

Aug. 29, 2008 (JP) ................................. 2008-221782

(51) Int. Cl.
*G06F 17/30* (2006.01)
(52) U.S. Cl. ......... 707/730; 707/706; 707/727; 707/731; 707/732; 709/201; 725/4; 725/86; 725/114; 725/151
(58) Field of Classification Search .................. 707/706, 707/727, 730, 731, 732; 709/201; 725/4, 725/86, 114, 151
See application file for complete search history.

(56) References Cited

U.S. PATENT DOCUMENTS

| | | | | |
|---|---|---|---|---|
| 6,256,747 | B1 * | 7/2001 | Inohara et al. | 714/4 |
| 6,738,776 | B2 * | 5/2004 | Kanameda | 709/246 |
| 6,804,662 | B1 * | 10/2004 | Annau et al. | 1/1 |
| 6,968,059 | B1 * | 11/2005 | Kimura | 380/201 |
| 7,650,621 | B2 * | 1/2010 | Thomas et al. | 725/87 |
| 2002/0059621 | A1 * | 5/2002 | Thomas et al. | 725/87 |
| 2003/0009343 | A1 * | 1/2003 | Spitzer | 704/277 |
| 2006/0031885 | A1 * | 2/2006 | Colter et al. | 725/61 |
| 2006/0149761 | A1 * | 7/2006 | Kim et al. | 707/100 |
| 2007/0043723 | A1 * | 2/2007 | Bitan et al. | 707/7 |

(Continued)

FOREIGN PATENT DOCUMENTS

JP 2001-086420 3/2001

(Continued)

OTHER PUBLICATIONS

Notification of Office Action with partial English translation in a corresponding Japanese application date Jun. 9, 2009, application No. 2008-221782.

*Primary Examiner* — Apu M Mofiz
*Assistant Examiner* — Hung D Le
(74) *Attorney, Agent, or Firm* — Blakely Sokoloff Taylor & Zafman, LLP

(57) ABSTRACT

According to one embodiment, a record information storage module stores record information related to content recorded by an external apparatus in association with a keyword representing the content and user information. A search information storage module stores a search phrase used for searching in an external apparatus in association with user information. A search word handler extracts a predetermined number of words having high search frequency from search phrases stored in association with specific user information to generate a word list. A record information handler extracts keywords stored in association with the specific user information to generate a keyword list. A ranking processor generates ranking information indicating a word in the word list which matches a keyword in the keyword list. A communicator provides the ranking information to an external apparatus corresponding to the specific user information.

8 Claims, 11 Drawing Sheets

U.S. PATENT DOCUMENTS

| | | |
|---|---|---|
| 2007/0186267 A1 | 8/2007 | Ohde et al. |
| 2007/0248334 A1 | 10/2007 | Murakoshi |
| 2008/0104057 A1* | 5/2008 | Billmaier et al. ............... 707/5 |
| 2008/0183698 A1* | 7/2008 | Messer et al. ................... 707/5 |
| 2008/0301734 A1* | 12/2008 | Goldeen et al. ................ 725/44 |
| 2009/0019006 A1* | 1/2009 | Kim et al. ....................... 707/3 |
| 2009/0132487 A1* | 5/2009 | Lev .................................. 707/3 |
| 2010/0235341 A1* | 9/2010 | Bennett .......................... 707/706 |

FOREIGN PATENT DOCUMENTS

| | | |
|---|---|---|
| JP | 2004-206517 | 7/2004 |
| JP | 2004-356691 | 12/2004 |
| JP | 2005-073190 | 3/2005 |
| JP | 2005-322165 | 11/2005 |
| JP | 2006-050322 | 2/2006 |
| JP | 2006-304109 | 11/2006 |
| JP | 2007-281856 | 10/2007 |

* cited by examiner

FIG.7

| DATE | SEARCH PHRASE | DIVIDED WORDS |
|---|---|---|
| 2008-05-13 17:18:19 | ABC SONG | ABC SONG |
| 2008-05-12 12:03:14 | GOLF JAPAN CUP | GOLF JAPAN CUP |
| 2008-05-13 10:22:33 | DOG - HOW TO CARE PETS | PET CARE DOGS |
| 2008-05-11 20:30:03 | ABC OF GOLF | GOLF ABC |
| . . . | . . . | . . . |

FIG.8

| PROGRAM ID | SCENE ID | START TIME | END TIME | KEYWORDS |
|---|---|---|---|---|
| 000010 | 0001 | 0:00:00 | 0:10:12 | GOLF |
| 000010 | 0002 | 0:10:13 | 0:24:30 | GOLF LAST DAY |
| 000011 | 0001 | 0:00:00 | 0:05:20 | ENGLISH ABC |
| 000012 | 0001 | 0:00:00 | 0:10:24 | DOG QUIZ |
| . . . | . . . | . . . | . . . | . . . |

FIG.9

```
1  ABC
2  GOLF
3  SONG
4  JAPAN CUP
5  PET
6  DOG
   .
   .
   .
```

FIG.10

```
GOLF
LAST DAY
ENGLISH
ABC
DOG
QUIZ
```

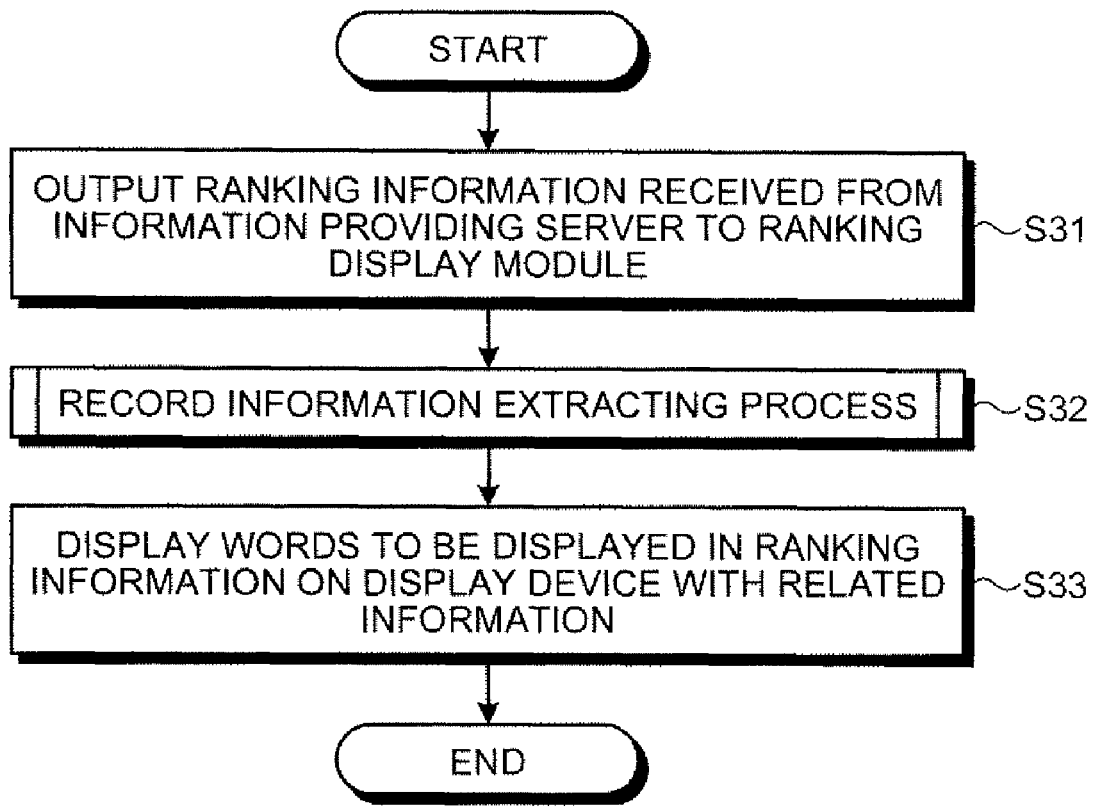

INFORMATION PROVIDING SERVER, INFORMATION PROVIDING METHOD, AND INFORMATION PROVIDING SYSTEM

CROSS-REFERENCE TO RELATED APPLICATIONS

This application is based upon and claims the benefit of priority from Japanese Patent Application No. 2008-221782, filed on Aug. 29, 2008, the entire contents of which are incorporated herein by reference.

BACKGROUND OF THE INVENTION

1. Field

One embodiment of the invention relates to an information providing server, an information providing method, and an information providing system.

2. Description of the Related Art

There have been proposed technologies for providing information related to contents desired by a user in viewing contents of TV programs or the like. For example, Japanese Patent Application Publication (KOKAI) No. 2001-86240 discloses a conventional technology in which user's preference is analyzed based on user's operation history and information of programs on which the operation is performed. Thus, programs that suit the user's preference are provided or automatically recorded based on information on programs which are to be broadcasted. Further, Japanese Patent Application Publication (KOKAI) No. 2004-356691 discloses a conventional technology in which user's preference is analyzed based on user's view history and operation history for recorded videos, and interest data is generated based on the analysis result. Thus, an electronic program guide (EPG) and related information such as web pages are provided according to the interest data. Further, with reference to interest data generated in a plurality of apparatuses, object-based interest data corresponding to an object selected by the user is extracted, and then specific contents are recommended to the user based on the object-based interest data.

With the conventional technologies described above, user's preference is analyzed based on such information as user's view history and operation history. Consequently, objects to be analyzed are limited to those related to video media, and such an analysis does not correctly reflects user's preference. Therefore, there is a need for a technology capable of providing a user with information related to contents that correctly reflects his/her preference.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 7 is an exemplary diagram of information stored in a search word DB in the first embodiment;

FIG. 8 is an exemplary diagram of information stored in a record information DB in the first embodiment;

FIG. 9 is an exemplary diagram of a word list extracted from divided words illustrated in FIG. 7 in the first embodiment;

FIG. 10 is an exemplary diagram of a keyword list extracted from the information stored in the record information DB illustrated in FIG. 8 in the first embodiment;

FIG. 11 is an exemplary diagram of ranking information generated from the word list illustrated in FIG. 9 and the keyword list illustrated in FIG. 10 in the first embodiment;

FIG. 12 is a flowchart of a ranking displaying process in the first embodiment;

DETAILED DESCRIPTION

Figure 1:
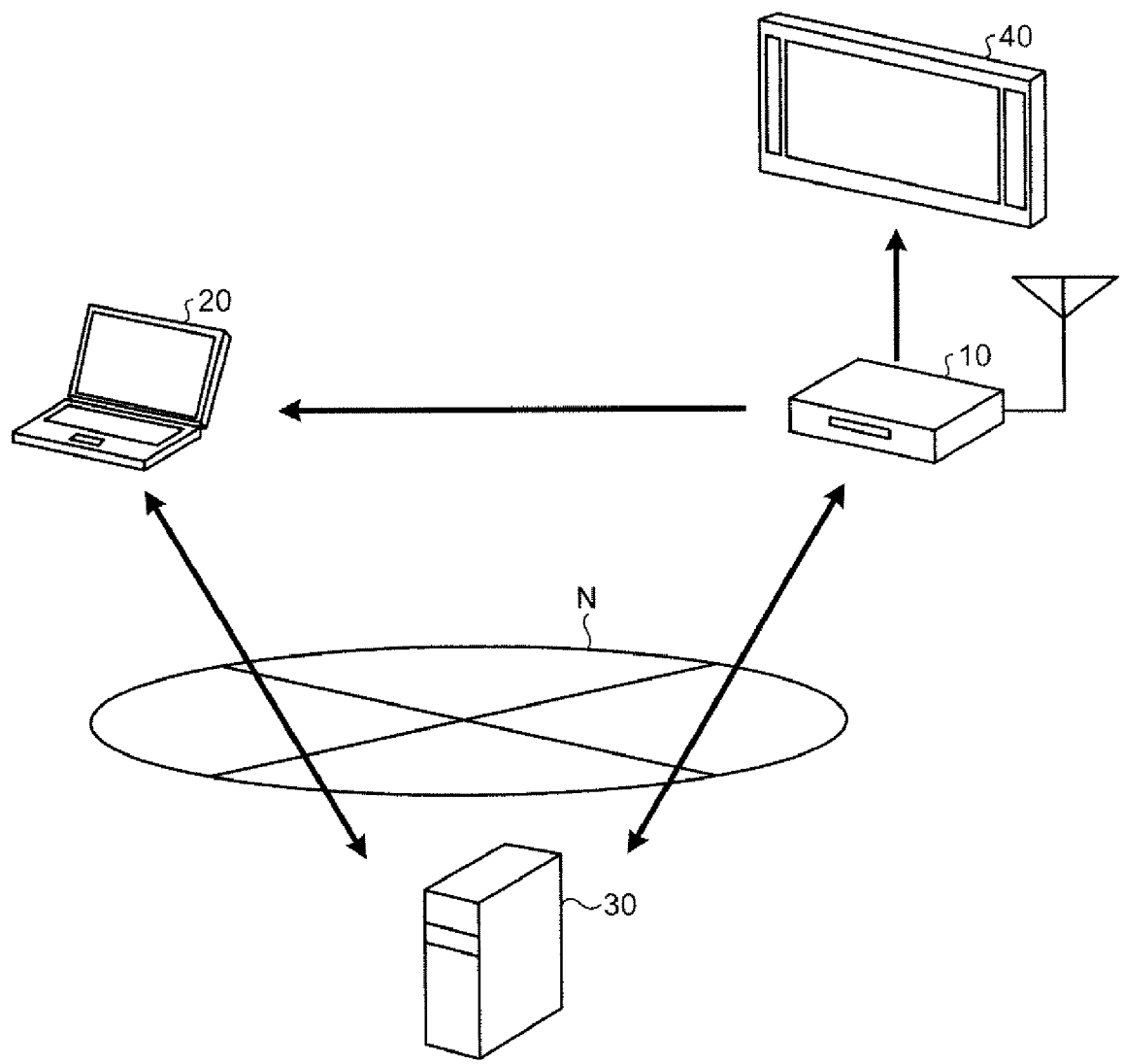
FIG. 1 is an exemplary schematic diagram of an information providing system according to an embodiment of the invention.

Various embodiments according to the invention will be described hereinafter with reference to the accompanying drawings. In general, according to one embodiment of the invention, an information providing server is communicably connected to a first apparatus and a second apparatus. The first apparatus stores content received from an external apparatus and recorded according to an instruction from a user in association with record information related to the content and a keyword representing the content. The second apparatus searches for information related to a search phrase specified by the user through a web browser. The information providing server comprises: a record information storage module configured to store a keyword representing content recorded on the first apparatus in association with user information identifying a user who instructs to record the content; a search information storage module configured to store a search phrase used for search by the second apparatus in association with user information identifying a user who instructs the search; a search word handler configured to extract a predetermined number of words having high search frequency from search phrases stored in the search information storage module in association with user information identifying a specific user to generate a word list; a record information handler configured to extract keywords stored in association with the user information identifying the specific user from the record information storage module to generate a keyword list; a ranking processor configured to generate ranking information indicating a word in the word list which matches a keyword in the keyword list; and an information provider configured to provide the ranking information to the first apparatus or the second apparatus, and display record information of content, among contents stored in the first apparatus, associated with a keyword corresponding to a word contained in the ranking information.

According to another embodiment of the invention, an information providing method is applied to an information providing server communicably connected to a first apparatus and a second apparatus. The first apparatus stores content received from an external apparatus and recorded according to an instruction from a user in association with record information related to the content and a keyword representing the content. The second apparatus searches for information related to a search phrase specified by the user through a web browser. The information providing method comprises: a first storage controller storing a keyword representing content recorded on the first apparatus in association with user information identifying a user who instructs to record the content in a record information storage module; a second storage controller storing a search phrase used for search by the second apparatus in association with user information identifying a user who instructs the search in a search information storage module; a search word handler extracting a predetermined number of words having high search frequency from search phrases stored in the search information storage module in association with user information identifying a specific user to generate a word list; a record information handler extracting keywords stored in association with the user information identifying the specific user from the record information storage module to generate a keyword list; a ranking processor generating ranking information indicating a word in the word list which matches a keyword in the keyword list; and an information provider providing the ranking information to the first apparatus or the second apparatus, and displaying record information of content, among contents stored in the first apparatus, associated with a keyword corresponding to a word contained in the ranking information.

According to another embodiment of the invention, an information providing system comprises a first apparatus configured to store content received from an external apparatus and recorded according to an instruction from a user in association with record information related to the content and a keyword representing the content, a second apparatus configured to search for information related to a search phrase specified by the user through a web browser, and an information providing server. The information providing server comprises: a record information storage module configured to store a keyword representing content recorded on the first apparatus in association with user information identifying a user who instructs to record the content; a search information storage module configured to store a search phrase used for search by the second apparatus in association with user information identifying a user who instructs the search; a search word handler configured to extract a predetermined number of words having high search frequency from search phrases stored in the search information storage module in association with user information identifying a specific user to generate a word list; a record information handler configured to extract keywords stored in association with the user information identifying the specific user from the record information storage module to generate a keyword list; a ranking processor configured to generate ranking information indicating a word in the word list which matches a keyword in the keyword list; and an information provider configured to provide the ranking information to the first apparatus or the second apparatus operated by the specific user. The first apparatus and the second apparatus each comprises a display controller configured to receive record information of content, among contents stored in the first apparatus, associated with a keyword corresponding to a word contained in the ranking information and display the record information with the word.

FIG. 1 is a schematic diagram of an information providing system according to the first embodiment. As illustrated in FIG. 1, the information providing system comprises a video recorder 10 and a client terminal 20 which are operated by a user, and an information providing server 30 which provides ranking information, described later, according to each user.

The video recorder 10 may be an HDD recorder or the like. The video recorder 10 receives a video signal from a broadcast station or an apparatus on a network N, and stores the video signal in a storage module 107, described later, as video data. Based on an instruction from a user received through an operation device (not illustrated), the video recorder 10 reproduces the video data in the storage module 107, and outputs it to a display device 40. The display device 40 may be a TV set or the like.

Figure 2:
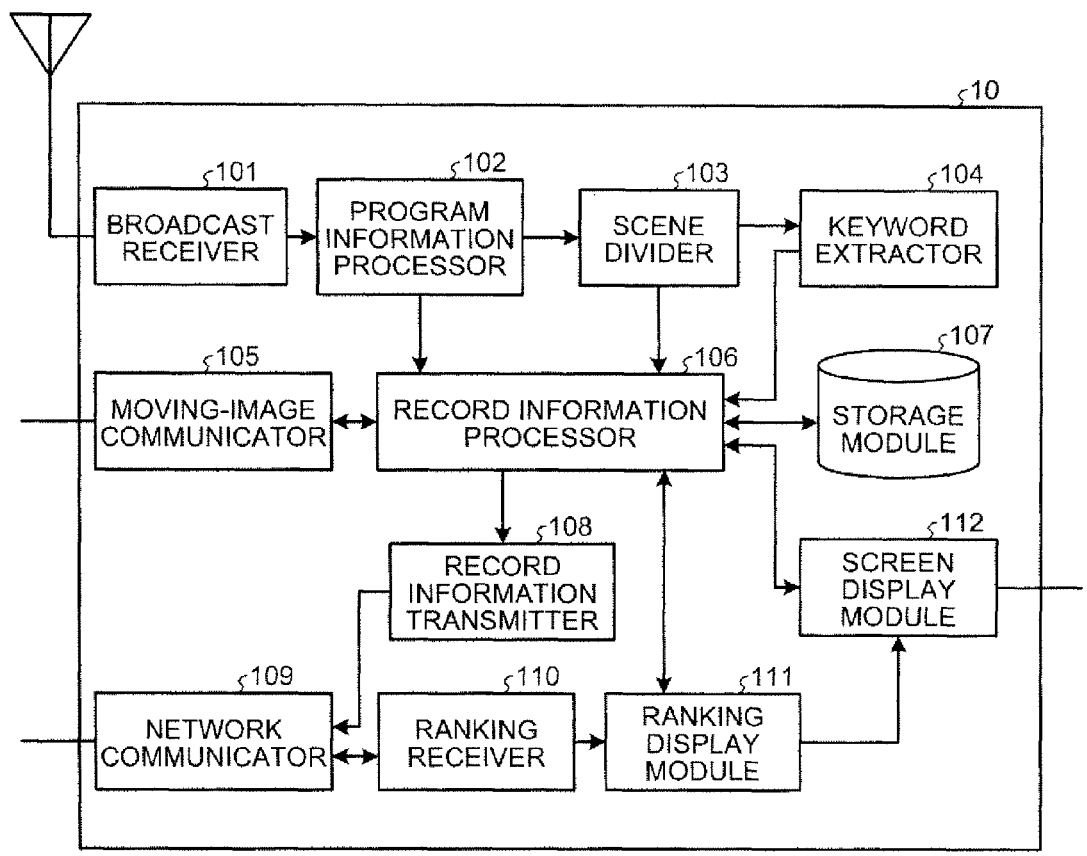
FIG. 2 is an exemplary block diagram of a video recorder according to a first embodiment of the invention.

FIG. 2 is a block diagram of the video recorder 10. As illustrated in FIG. 2, the video recorder 10 comprises a broadcast receiver 101, a program information processor 102, a scene divider 103, a keyword extractor 104, a moving-image communicator 105, a record information processor 106, the storage module 107, a record information transmitter 108, a network communicator 109, a ranking receiver 110, a ranking display module 111, and a screen display module 112.

The broadcast receiver 101 generates video data by decoding a video signal received from the outside, and outputs, when recording of the video data starts, contents such as video, sound, and subtitle forming the video data to the program information processor 102. Further, the broadcast receiver 101 outputs program information such as EPG information received from the outside to the program information processor 102. The video signal received by the broadcast receiver 101 may be TV broadcast, or the one received via the network N as, for example, is downloaded from an apparatus on the Internet.

The program information processor 102 obtains the program information including name, source, broadcast date and time, and category of contents from the broadcast receiver 101, edits the obtained program information, and outputs the program information to the record information processor 106. Further, the program information processor 102 obtains contents and the program information from the broadcast receiver 101, and outputs it to the scene divider 103.

The scene divider 103 analyzes video, sound, subtitle and the like contained in contents, and divides the contents into scenes using, for example, meta data indicating diving points. The contents may be analyzed by a commonly known technology as, for example, a method disclosed in Japanese Patent No. 4047264. The contents divided into scenes by the scene divider 103 are output to the record information processor 106 and the keyword extractor 104.

The keyword extractor 104 extracts text representing the content of each scene from subtitle, caption, and the like for each of the scenes into which the contents are divided by the scene divider 103. The keyword extractor 104 then divides the text into words through a morphological analysis or the like, and outputs the words to the record information processor 106 as keywords.

In response to a request from an external apparatus such as a personal computer (PC), the moving-image communicator 105 receives contents and thumbnail images from the record information processor 106 and transmits them to the external apparatus.

The record information processor 106 associates the information received from the program information processor 102, the scene divider 103, and the keyword extractor 104 with user information of a user who operates the video recorder 10, and stores the information in the storage module 107, whereby the contents (video data) are recorded. The user information is identification information that identifies the user who operates the video recorder 10. The user information may be the name of the user. The record information processor 106 generates thumbnail images of contents and stores the thumbnail images in the storage module 107 in association with the contents.

The record information processor 106 reads the contents and the thumbnail images and the like in response to a read request received from the moving-image communicator 105, the ranking display module 111, or the screen display module 112. Then, the record information processor 106 outputs the read information to the module which has sent the request.

Further, when the recording is finished, the record information processor 106 outputs, as record information, the program information stored in the storage module 107 in association with the recorded contents to the record information transmitter 108 with the user information and the keywords.

The storage module 107 includes a storage medium such as HDD, and stores therein the record information, the user information and keywords, which are associated with each other by the record information processor 106. The storage module 107 searches for contents corresponding to the read request from the record information processor 106 and outputs the contents to the record information processor 106.

The record information transmitter 108 outputs the record information of the contents which have been recorded, the user information, and the keywords to the information providing server 30 via the network communicator 109.

The network communicator 109 is connected to the network N, and transmits the record information, the user information, and the keywords received from the record information transmitter 108 to the information providing server 30 via the network N. Further, the network communicator 109 receives ranking information, described later, transmitted via the network N from the information providing server 30, and outputs the ranking information to the ranking receiver 110.

The ranking receiver 110 requests the information providing server 30 for the ranking information via the network N, and outputs the ranking information obtained from the information providing server 30 to the ranking display module 111.

The ranking display module 111 requests the record information processor 106 to read information such as thumbnail images and a path to content corresponding to each of ranked words contained in the raking information. Then, the ranking display module 111 adds the read information to the corresponding rank in the ranking information, and outputs the resultant information to the screen display module 112.

The screen display module 112 is connected to the display device 40 which can reproduce video and sound. The screen display module 112 displays the ranking information received from the ranking display module 111, and reproduces the contents.

The constituent elements of the video recorder 10 described above may be realized by cooperation of a CPU (not illustrated) and a predetermined program, or by specific hardware such as a microchip.

The client terminal 20 is an information communicating terminal such as a PC operated by a user, and connected to the information providing server 30 via the network N. The client terminal 20 is connected to the video recorder 10 on a wired or wireless basis.

Figure 3:
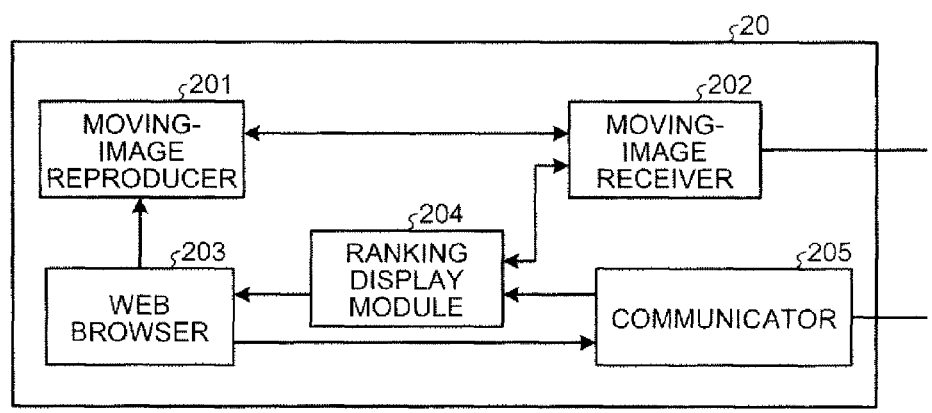
FIG. 3 is an exemplary block diagram of a client terminal in the first embodiment.

FIG. 3 is a block diagram of the client terminal 20. As illustrated in FIG. 2, the client terminal 20 comprises a moving-image reproducer 201, a moving-image receiver 202, a web browser 203, a ranking display module 204, and a communicator 205.

The moving-image reproducer 201 requests the moving-image receiver 202 to read contents, and performs processing such as play and pause on the obtained contents.

The moving-image receiver 202 is connected to the video recorder 10, and receives contents, thumbnail images, and the like from the video recorder 10 in response to a read request from the moving-image reproducer 201 or the ranking display module 204, and then outputs them to the moving-image reproducer 201 or the ranking display module 204.

The web browser 203 provides functions for viewing web sites, and, by outputting a search phrase used to search for a site to the communicator 205, transmits the search phrase to the information providing server 30 via the network N. The web browser 203 transmits the user information of the user who operates the client terminal 20 to the information providing server 30 with the search phrase.

The web browser 203 displays information related to the contents on a displaying device (not illustrated) based on the ranking information processed by the ranking display module 204. Further, when specific information is selected from information on the contents displayed on the displaying device through an operation device such as a keyboard (not illustrated), the web browser 203 requests the moving-image receiver 202 to read the contents corresponding to the selected information.

The ranking display module 204 requests a language analyzer 302 to read information such as a path to content corresponding to each of ranked words included in the ranking information and thumbnail images. The ranking display module 204 adds the read information to the corresponding rank in the ranking information, and outputs the resultant information to the web browser 203.

The communicator 205 provides a function for connecting to the information providing server 30 via the network N. The communicator 205 transmits, through the web browser 203, the search phrase used for searching to the information providing server 30 via the network N. Further, the communicator 205 receives the ranking information, described later, from the information providing server 30 via the network N, and outputs it to the ranking display module 204.

The constituent elements of the client terminal 20 described above may be realized by cooperation of a CPU (not illustrated) and a predetermined program, or by specific hardware such as ASIC.

The information providing server 30 receives various types of information from the video recorder 10 and the client terminal 20, and provides the ranking information, described later.

Figure 4:
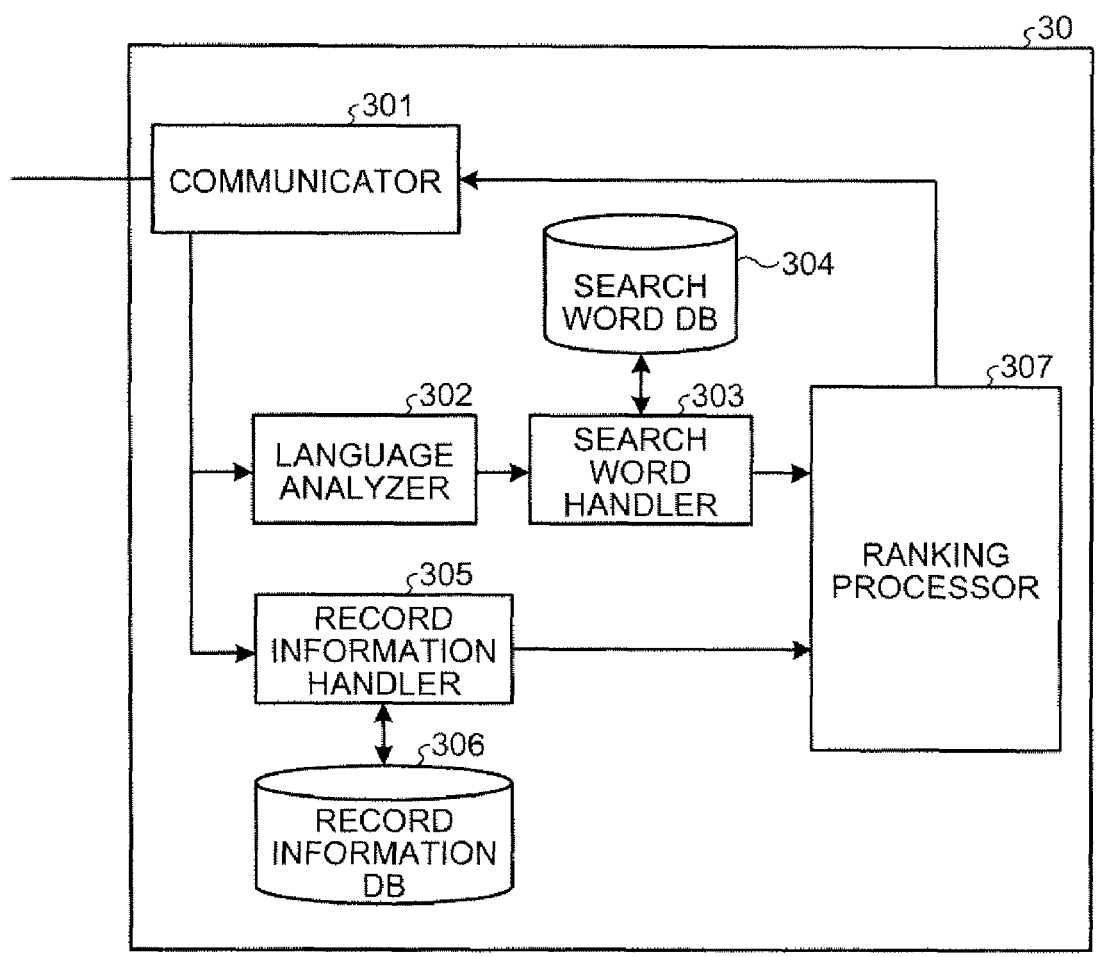
FIG. 4 is an exemplary block diagram of configuration of an information providing server in the first embodiment.

FIG. 4 is a block diagram of the information providing server 30. The information providing server 30 comprises a communicator 301, the language analyzer 302, a search word handler 303, a search word DB 304, a record information handler 305, a record information DB 306, and a ranking processor 307.

The communicator 301 provides a function for communicating information with the video recorder 10 and the client terminal 20 which are connected thereto via the network N. The communicator 301 receives from the video recorder 10 information such as the record information of contents which has been recorded, the user information of the user who operates the video recorder 10, and keywords extracted from the contents, and outputs the information to the record information handler 305. The communicator 301 receives from the client terminal 20 the search phrase used for searching in the web browser or the like, and outputs it to the language analyzer 302. Further, the communicator 301 receives the ranking information generated by the ranking processor 307, and transmits it to the video recorder 10 and the client terminal 20 via the network N.

The language analyzer 302 divides the search phrase received by the communicator 301 into words through the morphological analysis or the like, generates a list of independent words, and then outputs the list to the search word handler 303 with a word class, date and time (search date) at which the word is searched for, the user information, and the like.

The search word handler 303 stores the list received from the language analyzer 302 in the search word DB 304, generates the ranking information indicating words with the highest search frequency based on the stored words, and outputs the ranking information to the ranking processor 307. The ranking information is generated according to the word class, the search date, and the like of the words.

The search word DB 304 includes a storage medium such as HDD, and stores therein the word used for searching in association with the word class, the search date, the user information, and the like.

The record information handler 305 stores the record information, the user information, and the keywords received from the video recorder 10 in the record information DB 306 in association with each other. Further, the record information handler 305 obtains a list of all keywords from the record information DB 306, and outputs it to the ranking processor 307.

The record information DB 306 includes a storage medium such as HDD, and stores therein the record information, the user information, and the keywords received from the record information handler 305. The stored information is organized by category and associated with each other.

The ranking processor 307 generates the ranking information that lists only the words, of the search words in the ranking received from the search word handler 303, which match the keywords included in the keyword list received from the record information handler 305, and outputs the ranking information to the communicator 301.

The constituent elements of the information providing server 30 described above may be realized by cooperation of a CPU (not illustrated) and a predetermined program, or by specific hardware such as ASIC.

Figure 5:
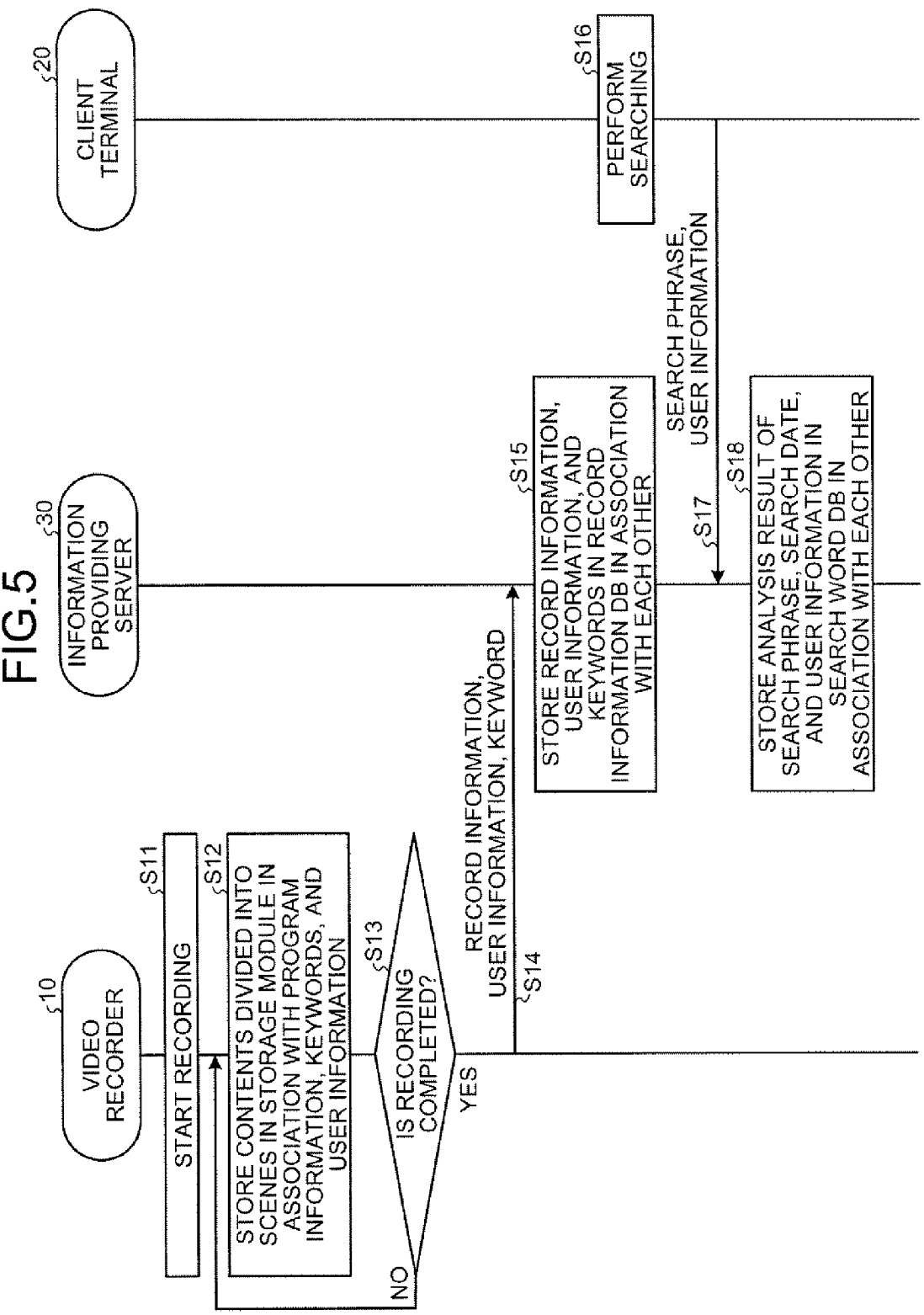
FIG. 5 is a sequence diagram of the operation of the information providing server for storing therein information in the first embodiment.

A process of storing various types of information in the information providing server 30 is described below with reference to FIG. 5. FIG. 5 is a sequence diagram of the operation of the information providing server 30 for storing therein the various types of information.

In the video recorder 10, when recording of the video signals received by the broadcast receiver 101 starts (S11), the record information processor 106 stores contents divided into scenes in the storage module 107 in association with the program information received by the program information processor 102, the keywords extracted by the keyword extractor 104, and the user information of the user who operates the video recorder 10 (S12).

The record information processor 106 continues the process S12 while the recording is not completed (No at S13). When the recording is completed (Yes at S13), the record information, the user information, and the keywords stored in the storage module 107 corresponding to the recorded contents are output to the information providing server 30 via the record information transmitter 108 and the network communicator 109 (S14).

In the information providing server 30, the record information handler 305 receives the record information, the user information, and the keywords via the communicator 301, and outputs the information in association with each other to the record information DB 306 (S15).

In the client terminal 20, when the searching with the search engine or the like is performed through the web browser 203 (S16), the web browser 203 outputs the search phrase used for the searching, and the user information of the user who operates the client terminal 20 to the information providing server 30 via the communicator 205 (S17).

In the information providing server 30, the language analyzer 302 receives the search phrase via the communicator 301, divides the search phrase into words, and outputs the analysis result including a list of independent words to the search word handler 303 with the date and time (search date) at which the search phrase is received, the user information, and the like. The search word handler 303 associates the received information with each other and stores the information in the search word DB 304 (S18).

As described above, in the information providing server 30, sets of the record information transmitted from the video recorder 10, the user information, and the keywords are stored in the record information DB 306. Further, sets of the information related to the search phrase transmitted from the client terminal 20 and the user information are stored in the search word DB 304.

The video recorder 10 and the client terminal 20 access the information providing server 30 independently at arbitrary timing.

Figure 6:
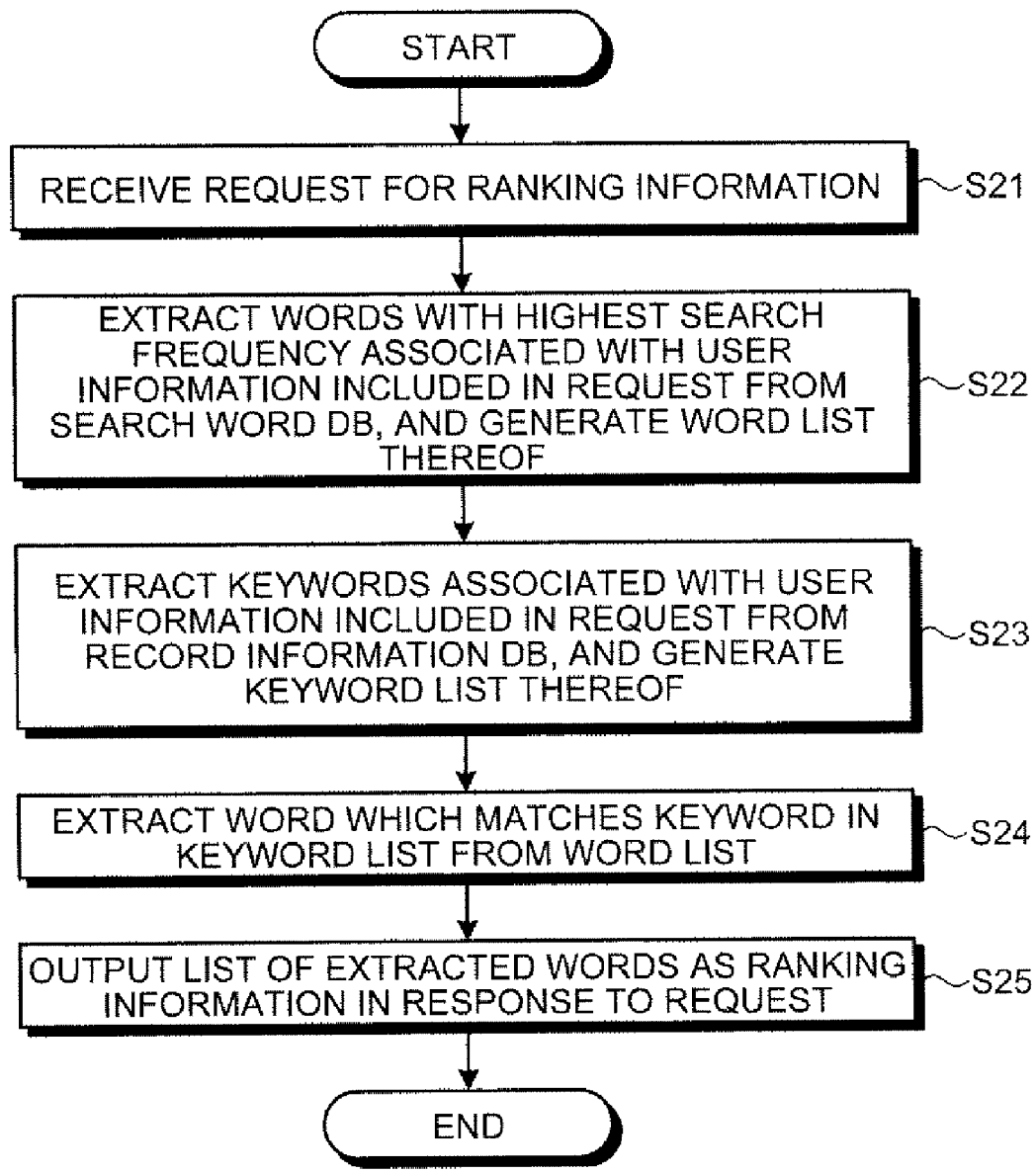
FIG. 6 is a flowchart of a ranking information generating process performed by the information providing server in the first embodiment.

Described below is the operation of the information providing server 30 to provide the ranking information according to an instruction from the video recorder 10 or the client terminal 20. FIG. 6 is a flowchart of a ranking information generating process performed by the information providing server 30.

First, the search word handler 303 receives a request for the ranking information from the ranking receiver 110 of the video recorder 10, or from the ranking display module 204 of the client terminal 20 via the communicator 301 (S21). The request for the ranking information includes a request for the user information of the user who operates the video recorder 10.

The search word handler 303 extracts a predetermined number of words with the highest search frequency (appearance frequency) from those stored in the search word DB 304 in association with the user information included in the request to generate a word list of the extracted words, and outputs the word list to the ranking processor 307 (S23). The number of words contained in the word list is not specifically determined. For example, the top 20 words with the highest search frequency may be contained in the word list.

The record information handler 305 extracts keywords stored in the record information DB 306 in association with the user information included in the request to generate a keyword list of the extracted keywords, and outputs the keyword list to the ranking processor 307 (S23).

The ranking processor 307 extracts, from the word list received from the search word handler 303, the words which are also contained in the keyword list received from the record information handler 305 (S24). The ranking processor 307 generates ranking information which lists the words extracted at S24, and then outputs the ranking information to the external apparatus (the video recorder 10 or the client terminal 20)

in response to the request received at S21 via the communicator 301 (S25), and the process ends.

FIG. 7 is an example of information stored in the search word DB 304. Illustrated in FIG. 7 are the search date and the search phrase which are associated with the same user information, and words divided by the language analyzer 302 (hereinafter, "divided words"). The pieces of the information are stored in association with each other. FIG. 8 is an example of information stored in the record information DB 306. Illustrated in FIG. 8 are the record information (program ID, scene ID, start time, and end time) and the keywords stored in association with the user information. The pieces of the information are stored in association with each other. The program ID is information to identify the same program.

The ranking information generating process are described with reference to FIGS. 7 and 8. At S22 of FIG. 6, words with the highest search frequency (appearance frequency) are extracted from the divided words in the search word DB 304. FIG. 9 is an example of a list of the words extracted from the divided words illustrated in FIG. 7. Although the word list of FIG. 9 is generated such that the word having the higher search frequency (appearance frequency), the more recent search date, and indicating a proper noun is placed at higher order, it is not limited to this. The word list may be generated with other elements as indices.

Subsequently, the keywords are extracted from those in the record information DB 306 to generate a list of the keywords at S23. FIG. 10 is an example of the list of the keywords extracted from the record information DB 306 illustrated in FIG. 8.

Then, the ranking processor 307 extracts a word which matches a keyword in the keyword list from the word list at S24. For example, the words illustrated in FIG. 11 are extracted when the word list illustrated in FIG. 9 and the keyword list illustrated in FIG. 10 are processed. FIG. 11 is an example of the ranking information generated from the word list of FIG. 9 and the keyword list of FIG. 10.

As described, the information providing server 30 extracts a group of words with the high search frequency (appearance frequency) from the search phrases used by the specific user for searching in the client terminal 20, compares the group of words with the keywords indicating the contents recorded by the video recorder 10, and generates the list of the words in the word list which match the keywords in the keyword list as the ranking information. Thus, the information providing server 30 can generate the list of words which reflects the user's preference more precisely.

In the embodiment, although the ranking information is a list of words, it is not limited to this. The ranking information may provide the record information stored in the record information DB 306 with the word list. Specifically, the ranking information may list words, in the word list, which match keywords in the keyword list with the record information stored in association with the keywords. In this case, the video recorder 10 and the client terminal 20 have less load for reading the record information, described later.

Described below is the operation of the apparatus (the video recorder 10 or the client terminal 20) which receives the ranking information from the information providing server 30. FIG. 12 is a flowchart of a ranking displaying process. The following assumes the case where the video recorder 10 receives the ranking information.

The ranking receiver 110 receives the ranking information from the information providing server 30 via the network N, and outputs the ranking information to the ranking display module 111 (S31).

The ranking display module 111 receives the ranking information from the ranking receiver 110, and performs a record information extracting process based on the ranking information (S32). The record information extracting process at S32 is described below with reference to FIG. 13.

Figure 13:
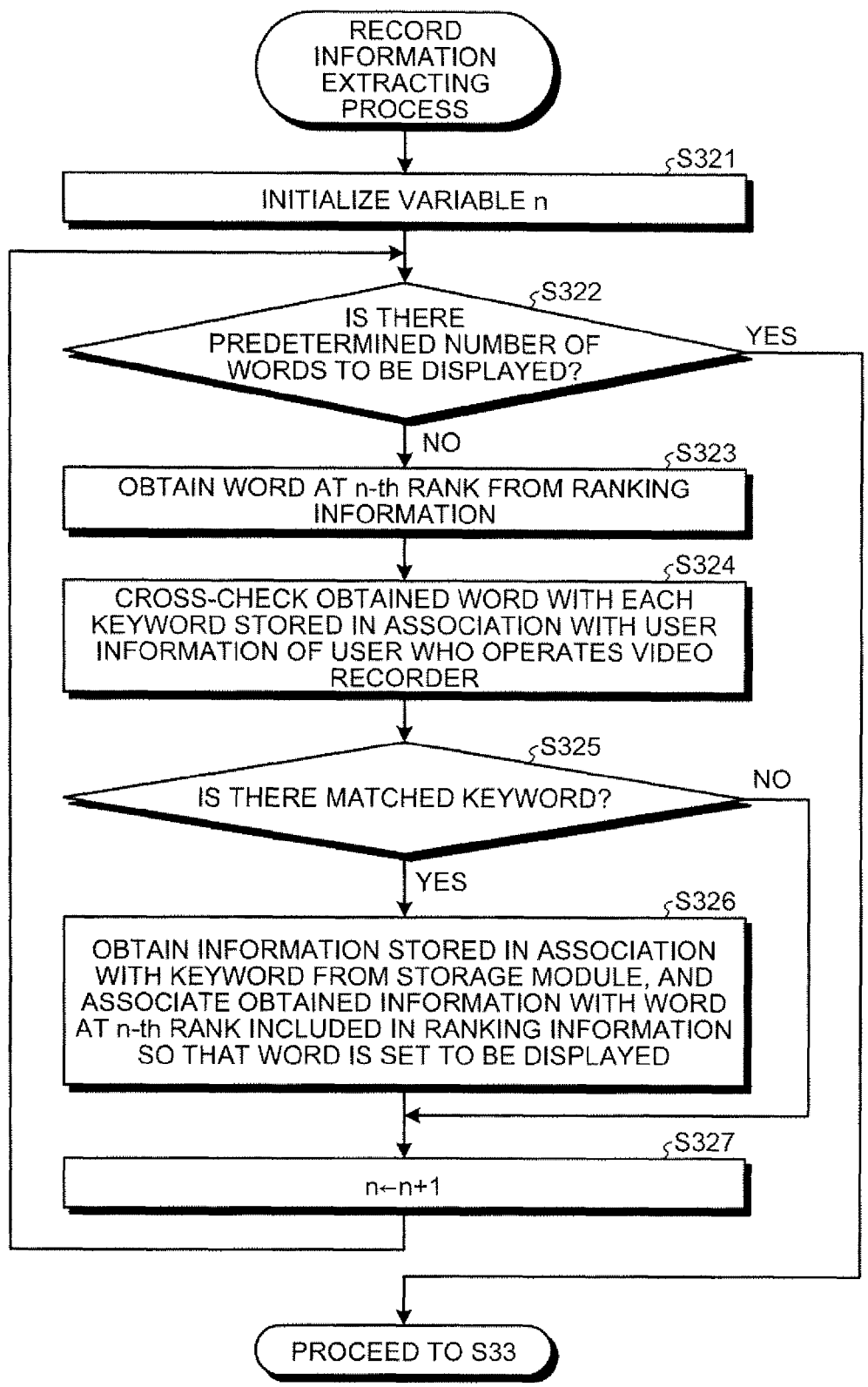
FIG. 13 is a flowchart of a record information extracting process illustrated in FIG. 12 in the first embodiment.

FIG. 13 is a flowchart of the record information extracting process. First, the ranking display module 111 initializes a variable n which represents a rank of each word in the ranking information, and sets the variable n to a value indicating a top rank (for example, n=1) (S321).

The ranking display module 111 determines whether there is a predetermined number of words to be displayed (S322). The predetermined number may be set arbitrarily or based on display capability of the apparatus which has sent a request for the ranking information.

When there is not a predetermined number of words (No at S322), the ranking display module 111 obtains a word at n-th rank from the ranking information (S323), associates the word with the user information of the user who operates the video recorder 10, and cross-checks the word with each keyword stored in the storage module 107 (S324). When there is no keyword that matches the word (No at S322), the process processes to S327.

When there is a keyword that matches the word at S324 (Yes at S325), the ranking display module 111 obtains the record information, destination information, thumbnail images, and the like stored in association with the keyword from the storage module 107. The ranking display module 111 associates the information with the n-th rank word registered in the ranking information, and sets the word to be displayed (S326).

The ranking processor 307 increments the variable n by 1 (S327), and the process returns to S322. When there is a predetermined number of words to be displayed at S322 (Yes at S322), the ranking processor 307 outputs the ranking information processed so far to the screen display module 112 (S327), and the process proceeds to S33 in FIG. 12.

Referring back to FIG. 12, the screen display module 112 displays on the display device 40 the words, in the ranking information received from the ranking display module 111, which are determined to be displayed with information associated therewith (S33), and the process ends.

Figure 14:
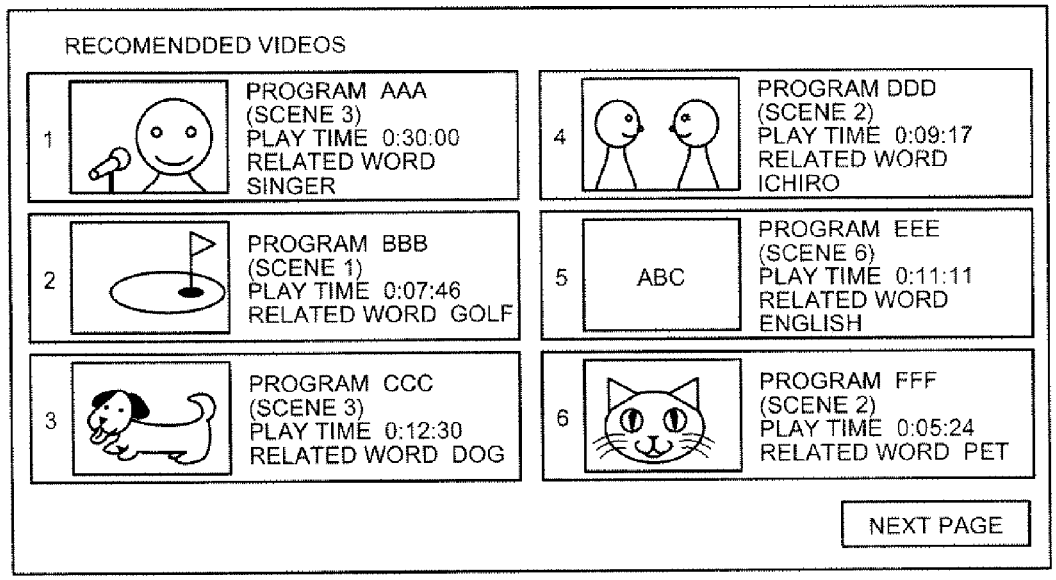
FIG. 14 is an exemplary diagram of the ranking information displayed on a screen display module of the video recorder in the first embodiment.

FIG. 14 is an example of the ranking information displayed by the screen display module 112 of the video recorder 10. As illustrated in FIG. 14, the n-th ranked word in the ranking information is displayed in association with the thumbnail images and the record information (program name, scene number, play time) of the contents corresponding to the word.

When one of information items corresponding to the contents displayed on the display device 40 is selected by the user, the screen display module 112 reads scenes of the contents corresponding to the selected information item from the storage module 107 via the record information processor 106, and performs cue reproduction.

As described above, based on the ranking information provided by the information providing server 30, the video recorder 10 displays information related to contents corresponding to each word in the ranking information. Thus, the video recorder 10 can provide the information related to the contents, which reflects the user's preference more precisely.

While the above describes as an example the process in which the video recorder 10 receives the ranking information, the same process is applicable to the client terminal 20. Specifically, in this case, the ranking display module 204 obtains the ranking information provided by the information providing server 30 via the communicator 205. Further, the ranking display module 204 performs the record information extracting process described above, and displays the ranking information as a result of the process via the web browser 203. When the record information extracting process is performed by the client terminal 20, the ranking display module 204 obtains, via the moving-image receiver 202, the record information, destination information, thumbnail images, and the like stored in the storage module 107 of the video recorder 10.

Figure 15:
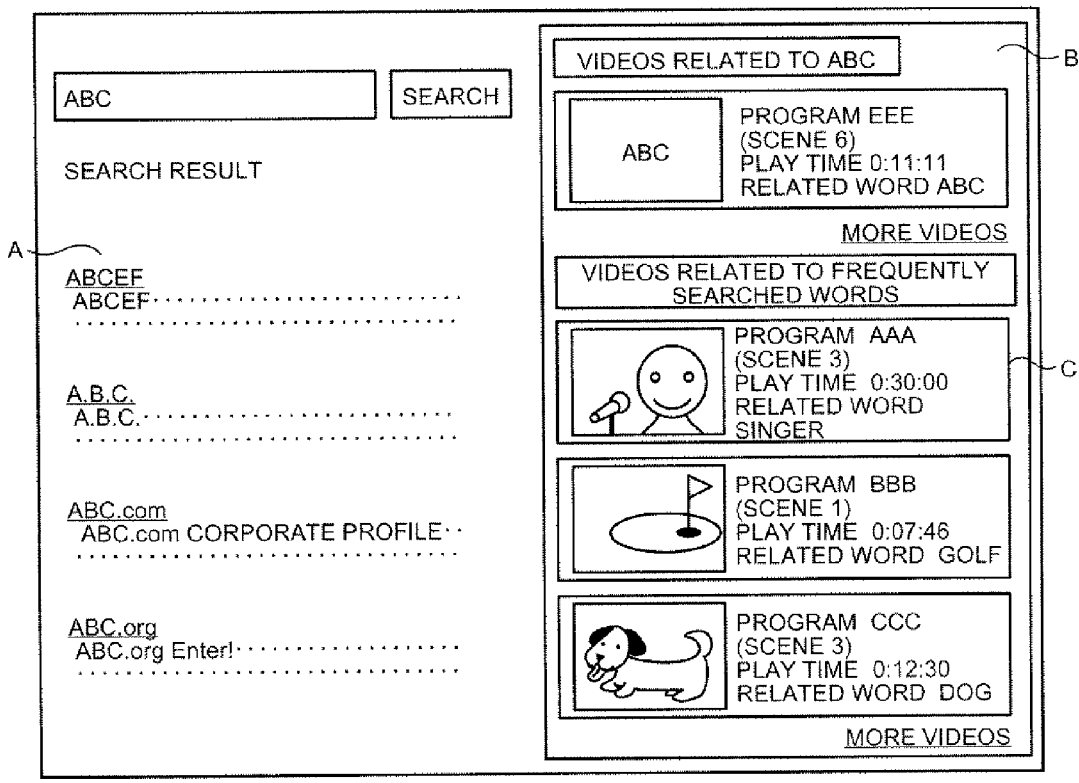
FIG. 15 is an exemplary diagram of the ranking information displayed on a web browser of the client terminal in the first embodiment.

FIG. 15 is an example of the ranking information displayed on the web browser 203 of the client terminal 20. In FIG. 15, a search result of the search engine for the search phrase "ABC" is displayed in an area A. Information related to the contents corresponding to the search phrase "ABC" is displayed in an area B. Information related to the contents corresponding to words having the high search frequency (related words) among previous search phrases besides the search phrase "ABC" is displayed in an area C. The display of the ranking information is not limited to that exemplified in FIG. 15, and, for example, the ranking information may display only information related to the contents corresponding to the search phrase "ABC".

When one of information items corresponding to the contents displayed by the web browser 203 is selected by the user, the moving-image reproducer 201 reads scenes of the contents corresponding to the selected information item from the storage module 107 of the video recorder 10 via the moving-image receiver 202, and performs cue reproduction.

As described above, according to the first embodiment, the information providing server 30 extracts a group of words whose search frequency is higher than a predetermined value for the specific user (user information), generates the ranking information listing words which match keywords representing recorded contents, and provides the ranking information to the corresponding user. Thus, the information providing server 30 can provide the user with information related to the contents, which reflects the user's preference more precisely. The apparatus which receives the ranking information can display the list of the contents corresponding to the words included in the ranking information. This allows the user to obtain the information related to the contents, which reflects the user's preference more precisely.

In the first embodiment, the client terminal 20 reproduces the contents and displays the ranking information. However, this is not so limited. The client terminal 20 may be configured not to have the moving-image reproducer 201, the moving-image receiver 202, and the ranking display module 204 so that the search available is the one using the web browser 203.

In the first embodiment, the specific ranking information is generated in the information providing server 30 to reflect information related to the contents recorded by the video recorder 10 for the specific user. In a second embodiment, a case in which the ranking processor 307 of the information providing server 30 described above is added to the video recorder 10 is described. The components corresponding to those in the first embodiment are designated by like reference numerals, and their description is not repeated.

Figure 16:
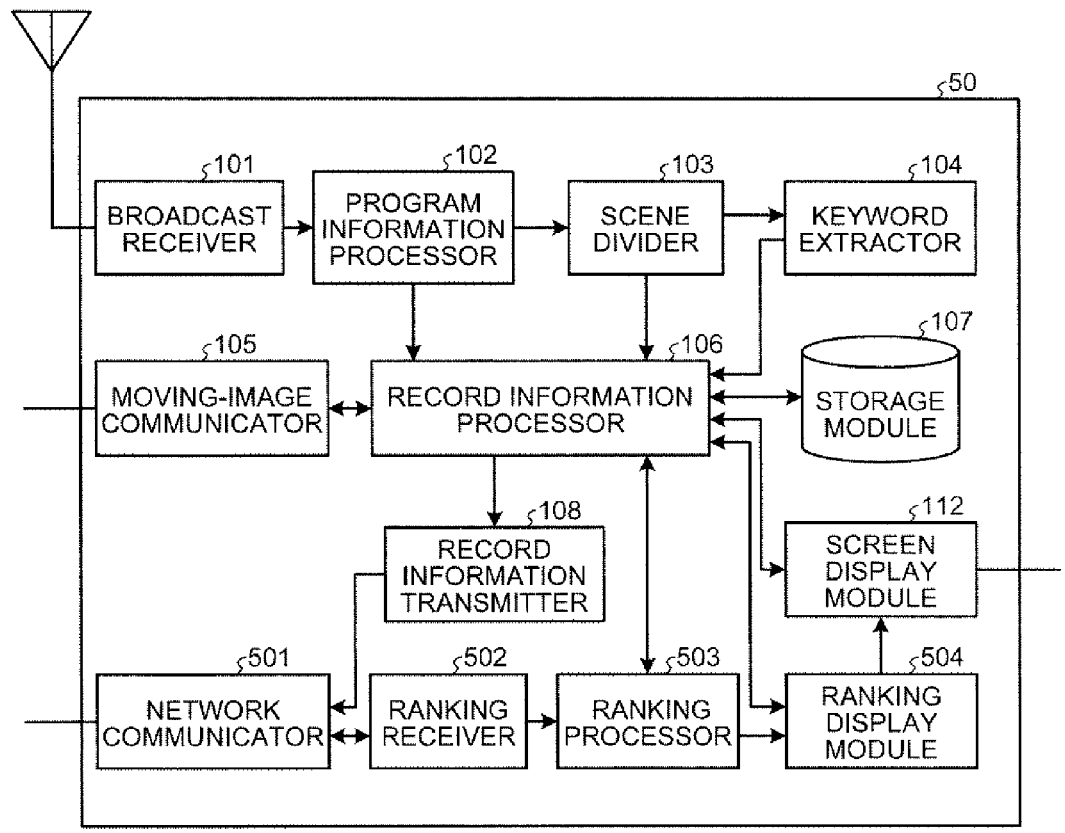
FIG. 16 is a block diagram a video recorder according to a second embodiment of the invention.

FIG. 16 is a block diagram of a video recorder 50 according to the second embodiment. The video recorder 50 corresponds to the video recorder 10.

As illustrated in FIG. 16, the video recorder 50 comprises the broadcast receiver 101, the program information processor 102, the scene divider 103, the keyword extractor 104, the moving-image communicator 105, the record information processor 106, the storage module 107, the record information transmitter 108, a network communicator 501, a ranking receiver 502, a ranking processor 503, a ranking display module 504, and the screen display module 112.

The network communicator 501 receives the ranking information and the word list from the external apparatus connected to the network N, and outputs it to the ranking receiver 502. The ranking information received by the network communicator 501 may be one generated by the information providing server 30, or one provided by a third party which collects information of users other than the user who operates the video recorder 50. Further, the word list may be one generated by the information providing server 30, or one provided by a third party which collects information of users other than the user who operates the video recorder 50.

The ranking receiver 502 analyzes the format of the ranking information and the word list received from the network communicator 501, converts the format into the one which can be processed by the ranking processor 503, and outputs them to the ranking processor 503.

The ranking processor 503 obtains the keywords of the contents which are currently recorded on the storage module 107 via the record information processor 106, selects words which match the keywords from the ranking information and the word list received from the ranking receiver 502, and outputs the selected words to the ranking display module 504.

The ranking display module 504 requests the record information processor 106 to read a path to content, thumbnail images, and the like corresponding to each of the words received from the ranking processor 503, adds the read information to the corresponding rank in the ranking information, and outputs the resultant information to the screen display module 112.

As described above, according to the second embodiment, in addition to the specific ranking information generated by the information providing server 30, the ranking information and the word list provided by the third party can also be used. Thus, the contents which reflect the user's preference more precisely can be provided.

In a third embodiment, a case in which the ranking processor 307 of the information providing server 30 described above is added to the client terminal 20 is described. The components corresponding to those in the first embodiment are designated by like reference numerals, and their description is not repeated.

Figure 17:
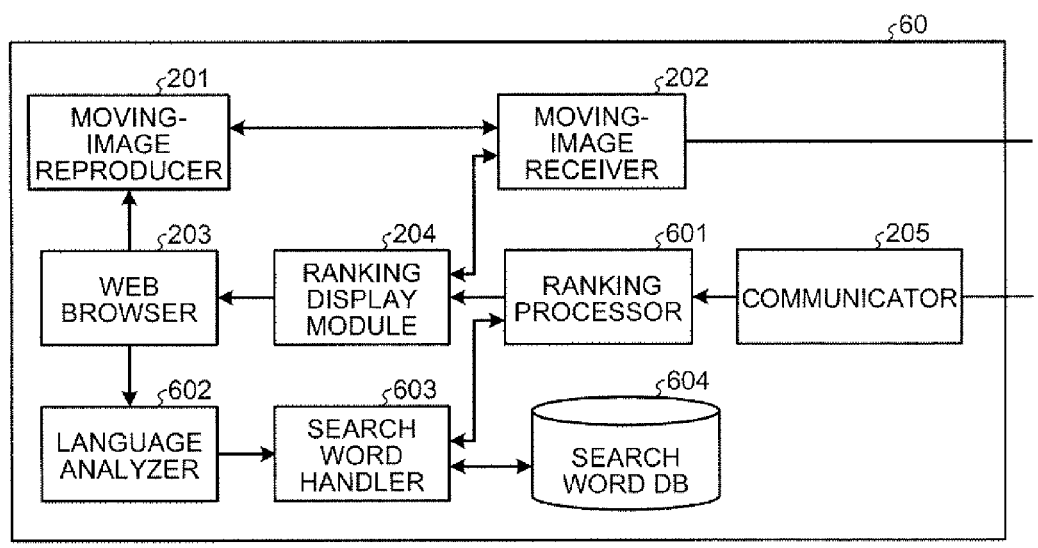
FIG. 17 is a block diagram of a client terminal according to a third embodiment of the invention.

FIG. 17 is a block diagram of a client terminal 60 according to the third embodiment. The client terminal 60 corresponds to the client terminal 20 described above.

As illustrated in FIG. 17, the client terminal 60 comprises the moving-image reproducer 201, the moving-image receiver 202, the web browser 203, the ranking display module 204, the communicator 205, a ranking processor 601, a language analyzer 602, a search word handler 603, and a search word DB 604.

The ranking processor 601 receives, via the communicator 205, keywords included in the contents which are currently recorded from the video recorder 10 or the like, selects words which match the keywords included in the contents currently recorded from the search word ranking received from the search word handler 603, and outputs the selected words to the ranking display module 204.

The language analyzer 602 receives the search phrase which is used for searching in the web browser 203, divides the search phrase into words through the morphological analysis or the like, and outputs the words to the search word handler 603 with the search date, the word class of each of the divided words, and the like.

The search word handler 603 stores the word list received from the language analyzer 602 in the search word DB 604, generates the ranking information including the words with high search frequency based on the stored words, and outputs the ranking information to the ranking processor 601. The ranking information is generated according to the word class, the search date, and the like as described above.

The search word DB 604 includes a storage medium such as HDD, and stores therein the words forming the search phrase in association with the word class, the search date, the user information, and the like.

With this configuration, the client terminal 60 itself can generate the ranking information of the search phrase and transmit it to the video recorder 10 without communicating with the information providing server 30 via the network N. Further, the client terminal 60 receives keywords included in the currently recorded contents, the contents, and thumbnail images, and thus can provide the screen as illustrated in FIG. 15.

As described above, according to the third embodiment, the client terminal 20 itself can generate the ranking information. Thus, the video recorder 10 and the client terminal 20 can provide the user with the contents which reflect the user's preference more precisely without the information providing server 30.

A program that implements the process described in the above embodiments may be provided as being stored in a computer-readable storage medium. Examples of the storage medium include a magnetic disk, an optical disk (CD-ROM, CD-R, DVD, etc.), a magnet-optical disk (MO, etc.), and a semiconductor memory. Any type of computer-readable storage medium can be used regardless of its storing form.

The program may be stored in a computer connected via a network such as the Internet and download via the network.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information providing server communicably connected to a first apparatus and a second apparatus, the first apparatus storing content received from an external apparatus and recorded according to an instruction from a user in association with record information related to the content and a keyword representing the content, the second apparatus searching for information related to a search phrase specified by the user through a web browser, the information providing server comprising:
    a record information storage module configured to store a keyword representing content recorded on the first apparatus in association with user information identifying a user who instructs to record the content;
    a search information storage module configured to store a search phrase used for search by the second apparatus in association with user information identifying a user who instructs the search;
    a search word handler configured to extract a predetermined number of words having high search frequency from search phrases stored in the search information storage module in association with user information identifying a specific user to generate a word list;
    a record information handler configured to extract keywords stored in association with the user information identifying the specific user from the record information storage module to generate a keyword list;
    a ranking processor configured to generate ranking information indicating a word in the word list which matches a keyword in the keyword list; and
    an information provider configured to provide the ranking information to any of the first apparatus and the second apparatus as requested, for subsequent display of record information of content, among contents stored in the first apparatus, associated with a keyword corresponding to a word contained in the ranking information.

2. The information providing server of claim 1, further comprising a receiver configured to receive from the first apparatus or the second apparatus a request for the ranking information including at least the user information identifying the specific user, wherein
    the search word handler is configured to extract the predetermined number of words having high search frequency from the search phrases stored in association with the user information included in the request, and
    the record information handler is configured to extract the keywords stored in association with the user information included in the request.

3. The information providing server of claim 1, further comprising a language analyzer configured to divide the search phrase into words, wherein
    the search information storage module is configured to store the search phrase as the words.

4. The information providing server of claim 1, wherein
    the search information storage module is configured to store search date at which searching is performed in association with a corresponding search phrase and user information, and
    the search word handler is configured to generate the word list in which the words are listed in descending order of search frequency and the search date.

5. The information providing server of claim 1, wherein the search word handler is configured to generate the word list in which a word indicating a proper noun is placed at higher order.

6. The information providing server of claim 1, wherein
    the record information storage module is configured to store the record information related to the content recorded on the first apparatus in association with the keyword and the user information;
    the ranking processor is configured to generate the ranking information indicating the word in the word list which matches the keyword in the keyword list with the record information associated with the keyword.

7. An information providing method applied to an information providing server communicably connected to a first apparatus and a second apparatus, the first apparatus storing content received from an external apparatus and recorded according to an instruction from a user in association with record information related to the content and a keyword representing the content, the second apparatus searching for information related to a search phrase specified by the user through a web browser, the information providing method comprising:
    a first storage controller storing a keyword representing content recorded on the first apparatus in association with user information identifying a user who instructs to record the content in a record information storage module;

a second storage controller storing a search phrase used for search by the second apparatus in association with user information identifying a user who instructs the search in a search information storage module;

a search word handler extracting a predetermined number of words having high search frequency from search phrases stored in the search information storage module in association with user information identifying a specific user to generate a word list;

a record information handler extracting keywords stored in association with the user information identifying the specific user from the record information storage module to generate a keyword list;

a ranking processor generating ranking information indicating a word in the word list which matches a keyword in the keyword list; and an information provider adapted to provide the ranking information to any of the first apparatus and the second apparatus that requests the ranking information, for subsequent display of record information of content, among contents stored in the first apparatus, associated with a keyword corresponding to a word contained in the ranking information.

8. An information providing system comprising:

a first apparatus configured to store content received from an external apparatus and recorded according to an instruction from a user in association with record information related to the content and a keyword representing the content;

a second apparatus configured to search for information related to a search phrase specified by the user through a web browser; and an information providing server comprising a record information storage module configured to store a keyword representing content recorded on the first apparatus in association with user information identifying a user who instructs to record the content;

a search information storage module configured to store a search phrase used for search by the second apparatus in association with user information identifying a user who instructs the search;

a search word handler configured to extract a predetermined number of words having high search frequency from search phrases stored in the search information storage module in association with user information identifying a specific user to generate a word list;

a record information handler configured to extract keywords stored in association with the user information identifying the specific user from the record information storage module to generate a keyword list;

a ranking processor configured to generate ranking information indicating a word in the word list which matches a keyword in the keyword list; and an information provider configured to provide the ranking information to the first apparatus that is operated by the specific user and differs from the second apparatus that conducted the prior search for information related to the search phrase, wherein the first apparatus and the second apparatus each comprises a display controller configured to receive the record information of content, among contents stored in the first apparatus, associated with a keyword corresponding to a word contained in the ranking information and display the record information with the word.

* * * * *